United States Patent [19]

Johannesen

[11] 4,360,959
[45] Nov. 30, 1982

[54] METHOD FOR MANUFACTURING A DRUM BRAKE SHOE

[75] Inventor: Donald D. Johannesen, South Bend, Ind.

[73] Assignee: The Bendix Corporation, Southfield, Mich.

[21] Appl. No.: 287,960

[22] Filed: Jul. 29, 1981

[51] Int. Cl.³ .................. B23P 17/00; F16D 65/08; B21D 22/02

[52] U.S. Cl. .................... 29/417; 72/338; 72/379; 188/250 C; 188/250 H

[58] Field of Search .............. 72/338, 379, 339; 188/250 C, 250 H, 250 A, 250 F, 250 B, 250 R; 29/417

[56] References Cited

U.S. PATENT DOCUMENTS

| | | | |
|---|---|---|---|
| 1,459,237 | 6/1923 | Muhleisen | 188/250 H |
| 1,574,106 | 2/1926 | Perrot | 188/250 C |
| 1,794,348 | 2/1931 | Chase | 188/250 C |
| 2,591,483 | 4/1952 | West | 72/338 |
| 3,195,340 | 7/1965 | Zunich | 72/379 |
| 3,292,412 | 12/1966 | Costabile | 72/338 |
| 4,114,417 | 9/1978 | LaVene | 72/379 |

Primary Examiner—Ervin M. Combs
Assistant Examiner—Steven Nichols
Attorney, Agent, or Firm—Paul David Schoenle; Ken C. Decker

[57] ABSTRACT

A method for manufacturing a drum brake shoe comprises the steps of providing a strip of material, forming a plurality of connected blanks with the strip, bending each blank to form an arcuate surface with adjoining sides, cutting one of the blanks by serving a connecting link and trimming the one blank to form a contour for the adjoining sides. Thereafter, a friction lining is attached to the arcuate surface.

8 Claims, 6 Drawing Figures

METHOD FOR MANUFACTURING A DRUM BRAKE SHOE

This invention relates to a method for manufacturing a drum brake shoe for a drum brake assembly. The drum brake assembly generally includes a pair of brake shoes which cooperate with a hydraulic actuator during braking to frictionally engage a drum, thereby retarding the rotation of the drum.

A drum brake shoe includes a rim with a friction lining attached thereto and a web coupled to the rim. The web inhibits deformation of the rim and lining during braking and also transfers torque to an abutment. Furthermore the web limits the direction of movement for the rim so that it uniformally engages the drum during each brake application. In order to manufacture the prior art drum brake shoe, each rim is individually stamped from a roll of stock and bent to form an arcuate surface. The web is separately stamped from a roll of stock and welded to the rim opposite the arcuate surface. Thereafter, the friction lining is either bonded to the arcuate surface or riveted thereto. The welding operation joining the web to the rim requires costly man hours and machinery.

The present invention eliminates the costly welding operation for the rim and web by providing a method for manufacturing a drum brake shoe having an arcuate outer surface carrying a friction lining and an inner abutment cooperating with a hydraulic actuator, comprising the steps of:

(a) providing a flat strip of material;
(b) forming a plurality of blanks on said flat strip of material, said plurality of blanks being connected to each other by links;
(c) bending said plurality of blanks to define the arcuate outer surface on each of the blanks, said bending step also forming a pair of sides for the blanks extending from the arcuate surface to the respective links;
(d) cutting one of said blanks from the remaining plurality of blanks;
(e) trimming said one blank to remove the links therefrom and also to form the inner abutment on said one blank; and
(f) attaching the friction lining to said one blank after it is bent and trimmed.

It is an advantage of the present invention that a drum brake shoe is provided in the absence of a costly welding operation. Furthermore, a pair of sides or webs are simultaneously formed with an arcuate surface for carrying a friction lining.

Figure 1:
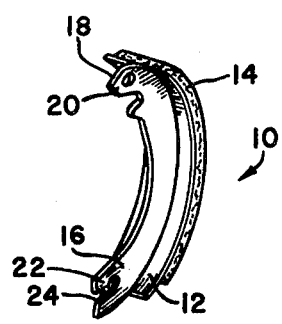
FIG. 1 is a perspective view of a drum brake shoe constructed in accordance with the prior art.

In FIG. 1, a drum brake shoe 10 defines an arcuate rim 12 with a friction lining 14. A web 16 extends transversely from the middle of the rim 12 opposite from the friction lining 14. The web is modified at a first end 18 to form an abutment 20 while a second end 22 of the web is modified to form a slot 24 for receiving an adjuster assembly (not shown). In order to connect the web 16 to the rim 12, the web is welded to the rim.

Figure 2:
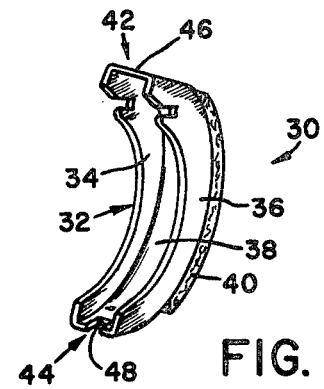
FIG. 2 is a perspective view of a drum brake shoe constructed in accordance with the present invention.

In FIG. 2, a drum brake shoe 30 constructed in accordance of the present invention is shown. The drum brake shoe 30 includes a one piece C shaped rim 32 with sides 34 and 36 extending transversely from a middle plate 38. The plate 38 is modified to fixedly carry a friction lining 40, similar to the friction lining 14 of FIG. 1. The middle plate 38 terminates in ends 42 and 44 which are modified to define an abutment 46 and a slot 48, respectively. The abutment 46 and the slot 48 perform the same function for shoe 30 as the abutment 20 and the slot 24 for the shoe 10.

Figure 3:
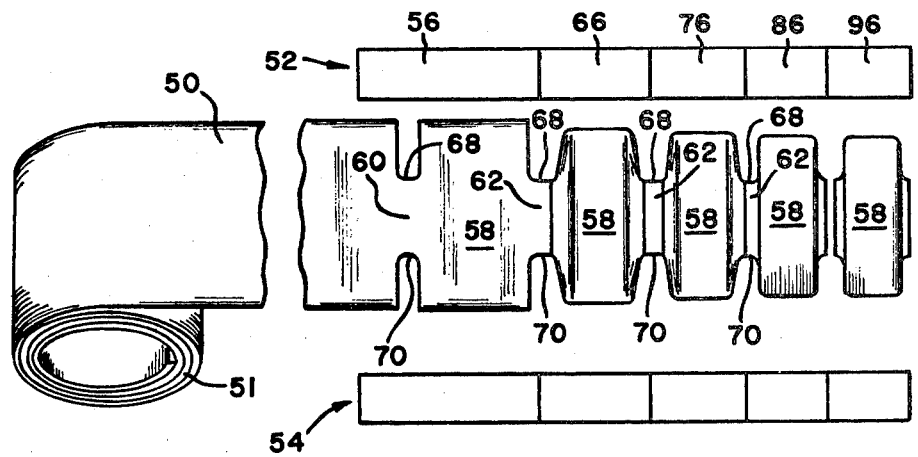
FIG. 3 is a schematic illustration of the method used in the present invention to manufacture a drum brake shoe from a strip of stock material.
Figure 4:
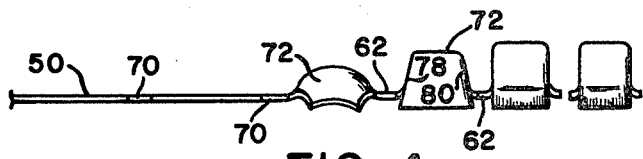
FIG. 4 is a side view of the schematic illustration in FIG. 3.
Figure 5:
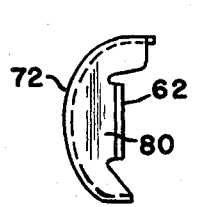
FIG. 5 is a view of a blank cut from the schematic illustrations of FIGS. 3 and 4.
Figure 6:
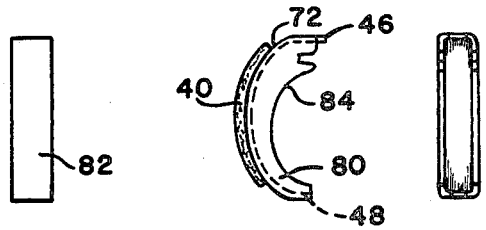
FIG. 6 is a view similar to FIG. 5 after a trimming operation.

The present invention is illustrated in FIGS. 3 and 4. A strip of stock material 50 is fed from a roll 51 through a press or a number of presses indicated schematically at 52 and 54, 52 representing the head of the press and 54 representing the base thereof. At a first station 56 of the press, the strip of material 50 is stamped via a suitable tool to form a blank 58 with a connecting link 60. Link 60 connects the blank 58 with the strip of material 50 while link 62 formed earlier at station 56 connects the blank 58 with the preceding blank at a second station 66. The links 60 and 62 also form oppositely disposed recesses 68 and 70, respectively. The axial dimension of each blank 58 is controlled by the successive recesses 68 and 70. At the second station 66, the blank 58 is bent by a suitable tool and die to form a rounded outer surface 72, see FIG. 4, which extends across the complete width of the blank 58. The surface 72 corresponds to the middle plate 38 in FIG. 2. At a third station 76, the blank 58 is further deformed by bending to shape the outer surface 72 with an arcuate contour. As seen more clearly in FIG. 4, the bending steps at stations 66 and 76 also form sides 78 and 80 which extend from the arcuate outer surface 72 to the connecting links 62. At a fourth and final bending station 86, the outer surface 72 is formed to a predetermined arcuate contour and the sides 78 and 80 are bent to extend substantially perpendicular from the arcuate surface 72. It is feasible that more or less bending stations, such as shown at 66, 76 and 86, can be provided so long as the arcuate surface 72 and the sides 78 and 80 are formed to their predetermined contour. The fifth and last station 96 cuts the last blank 58 from the remaining blanks at stations 56-86. The cutting step at station 96 severs the link 62 adjacent station 86 so that the separate blank can be moved individually to a trimming machine represented by a box 82 in FIG. 5. The trimming machine 82 is operable to remove the remaining portions of the links 62 from the separate blank 58 and also to provide each side 78 and 80 with a predetermined contour 84. In addition, the trimming machine forms the desired contour for the abutment 46 and the slot 48 on brake shoe 30. Finally, in FIG. 6 the friction lining 40 is attached to the arcuate surface 72.

Viewing FIGS. 3 and 4, it is contemplated that the press 52, 54 is a progressive press so that the material 50 will extend from station 1 at 56 to station 96 immediately prior to cutting. Suitable pulling or pushing servomotors are provided with the press 52, 54 to feed and locate the material 50 with reference to each station 56-96.

There are many variations to the method disclosed herein and these variations, where feasible by one skilled in the art, are intended to fall within the scope of the apended claims.

As the blanks 58 pass from station 56 to station 96, the width and length of the blanks are reduced, whereas the connecting links 62 remain substantially the same dimension. Furthermore, the arcuate surface 72 extends above and below the connecting links 62 during the bending operations at stations 66, 76 and 86.

I claim:

1. A method for manufacturing a drum brake shoe having an arcuate outer surface carrying a friction lining and an inner abutment cooperating with a hydraulic actuator, comprising the steps of:
   (a) providing a flat strip of material;
   (b) forming a plurality of blanks on said flat strip of material, said plurality of blanks being connected to each other by links;
   (c) bending said plurality of blanks to define the arcuate outer surface on each of the blanks, said bending step also forming a pair of sides for the blanks extending from the arcuate surface to the respective links;
   (d) cutting one of said blanks from the remaining plurality of blanks;
   (e) trimming said one blank to remove the links therefrom and also to form the inner abutment on said one blank; and
   (f) attaching the friction lining to said one blank after it is bent and trimmed.

2. The method of claim 1 in which said links connect adjacent sides for successive blanks after said successive blanks are subjected to bending.

3. The method of claim 1 in which said connecting links define a transverse dimension which remains substantially uniform throughout said steps, said plurality of blanks defining a transverse dimension which decreases in length through said steps and said plurality of blanks defining an axial dimension which also decreases in length through said steps.

4. The method of claim 1 in which said plurality of blanks define a substantially U-shaped channel in cross section after said bending step.

5. The method of claim 1 in which said connecting links define a reference line and said bending step disposes a first portion of said plurality of blanks below the reference line and a second portion of said plurality of blanks above the reference line.

6. The method of manufacturing a drum brake shoe with a friction lining attached thereto, in which a strip of material is fed through a press or a number of presses, said press or number of presses performing the following steps:
   (a) forming a plurality of blanks with connecting links between each blank;
   (b) bending each of said blanks to form an arcuate surface adapted to engage the friction lining, said bending simultaneously forming a pair of side flanges extending transversely from the arcuate surface to a pair of the links, respectively;
   (c) cutting at least one of said plurality of blanks from the remaining plurality of blanks such that said one blank is separated at one of its links from the remaining plurality of blanks; and
   (d) trimming said one blank to separate the links from said one blank.

7. The method of claim 6 in which the brake shoe defines an abutment surface opposite the friction lining and a hydraulic actuator cooperates with the abutment surface during braking, said abutment surface being formed on said one blank during said trimming step.

8. The method of claim 6 in which said bending step forms a substantially U-shaped channel for each of said blanks in cross section and said U-shaped channel defining a progressively shorter height away from said links.

* * * * *